June 17, 1941.  E. J. HORNBERGER  2,245,858
DRILL GRINDING MACHINE
Filed Jan. 26, 1940   5 Sheets-Sheet 1

WITNESSES:
Thomas W. Kerr, Jr.
George L. Combs

INVENTOR:
Earl J. Hornberger
BY Paul Paul
ATTORNEYS.

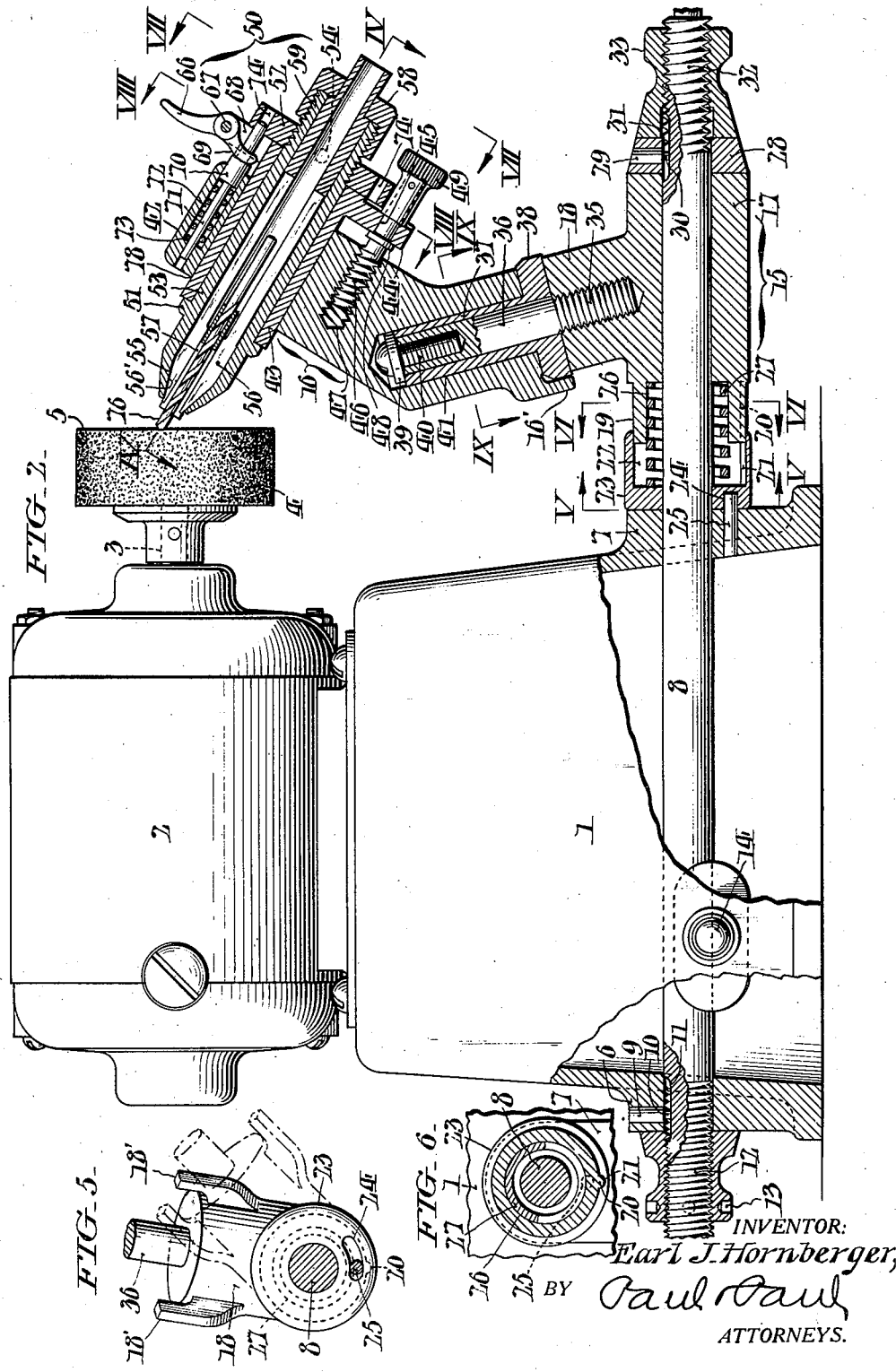

INVENTOR:
Earl J. Hornberger
BY Paul & Paul
ATTORNEYS.

June 17, 1941.　　　E. J. HORNBERGER　　　2,245,858
DRILL GRINDING MACHINE
Filed Jan. 26, 1940　　　5 Sheets-Sheet 4
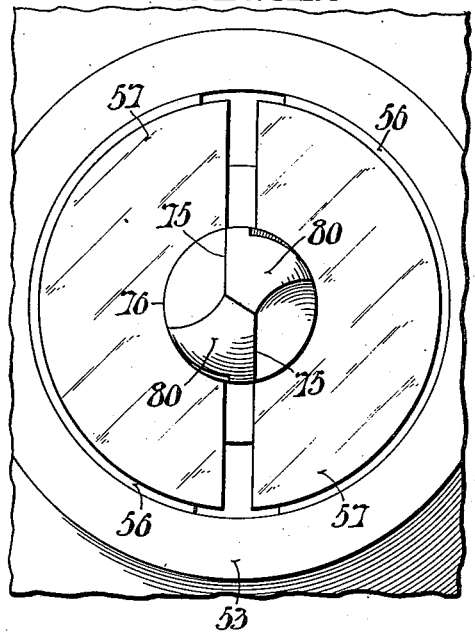
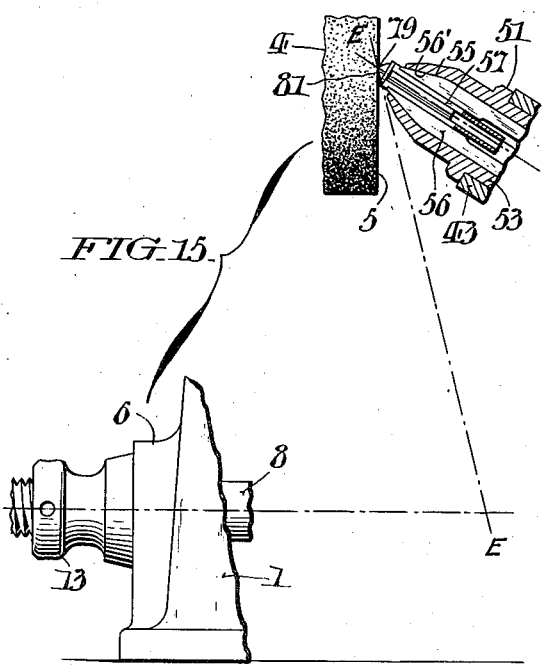
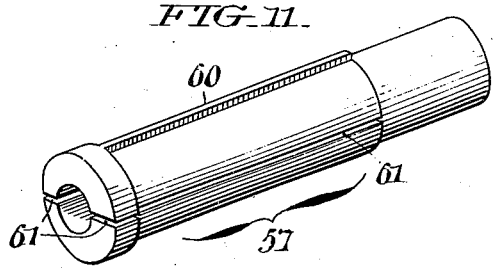
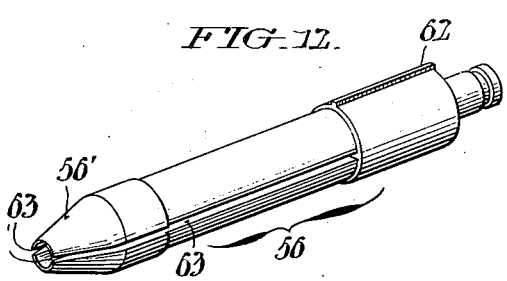
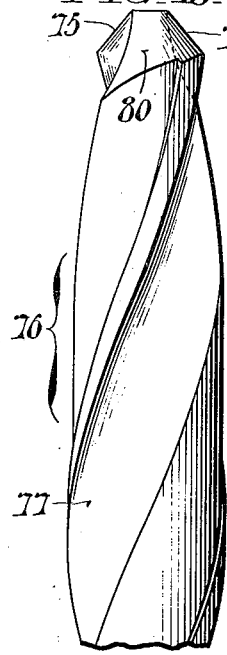
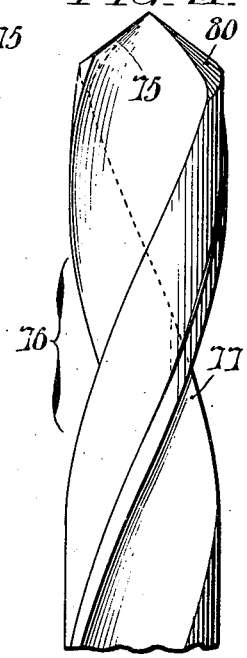
WITNESSES:
Thomas W. Kerr, Jr.
George L. Comly
INVENTOR:
Earl J. Hornberger,
BY Paul & Paul
ATTORNEYS.

June 17, 1941.  E. J. HORNBERGER  2,245,858
DRILL GRINDING MACHINE
Filed Jan. 26, 1940   5 Sheets-Sheet 5
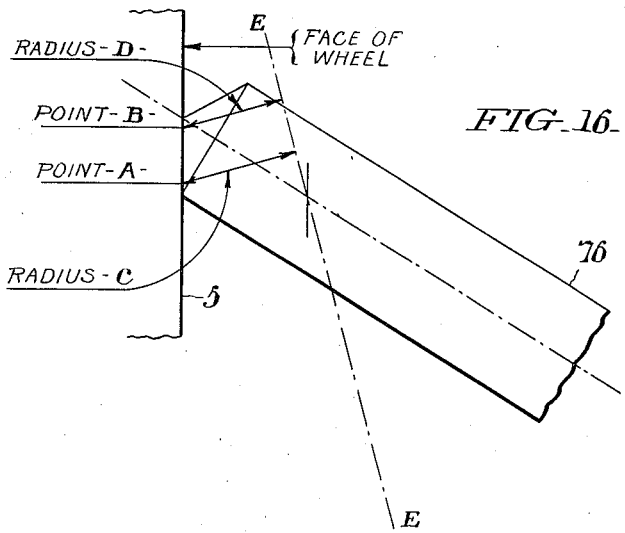
FIG_16_
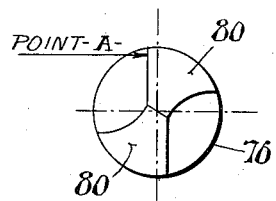
FIG_17_
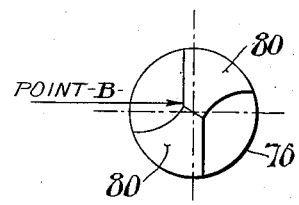
FIG_19_
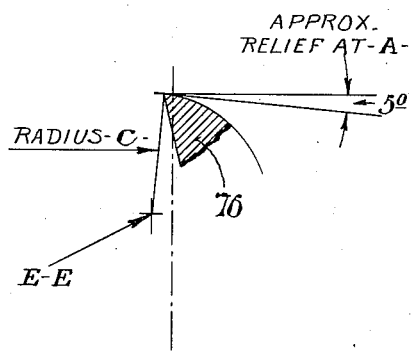
FIG_18_
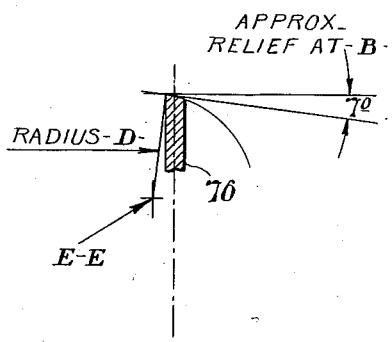
FIG_20_
WITNESSES:
Thomas W. Kerr Jr
George L. Comly
INVENTOR:
Earl J. Hornberger,
BY Paul & Paul
ATTORNEYS.

Patented June 17, 1941

2,245,858

UNITED STATES PATENT OFFICE 2,245,858

DRILL GRINDING MACHINE

Earl J. Hornberger, Philadelphia, Pa.

Application January 26, 1940, Serial No. 315,711

15 Claims. (Cl. 51—219)

This invention relates to grinding means for sharpening the points or cutting edges of twist drills and the like, and it has for a general object to provide a machine enabling such procedure to be effected with greater accuracy than heretofore, and preassurance that both cutting edges are of exactly corresponding size with the point of mergence directly through the axial center of the drill.

Another object of this invention is to provide a grinding machine including means whereby the relief angle of the drill is greater at or near the center than at the outer edges of said drill.

Further objects have reference to improved means whereby drills having various cutting-angles can be readily ground; an improved machine of the indicated type capable of accurately pointing twist drills; a machine equipped for readily re-dressing the active face of the grinder member without removal from said machine and accurately resetting the latter after such operation to the proper point of intersection; a machine including graduated dials whereby the operator, without consulting charts or resorting to guesswork, can set said dials in accordance with the size of drill to be ground so that the desired point will be correctly produced. In addition to the foregoing objects, it is an aim of the instant invention to furnish a grinding machine that is convenient and simple in structure, as well as very efficient in operation.

Still further objects and ancillary advantages of this invention will hereinafter appear, as the nature thereof is more fully explained, said invention consisting substantially in certain novel features of construction, the combination and correlation of parts hereinafter disclosed, and illustrated by the accompanying drawings of a typical embodiment, wherein corresponding reference characters are used to designate similar parts throughout the several views; while the concluding claims more particularly recite the features of novelty.

In the drawings:

Fig. 2 is a part elevation and part section of the same.

Fig. 5 is a detail section on the plane V—V in Fig. 2.

Fig. 6 is a similar section on the plane VI—VI in Fig. 2.

Fig. 10 is a fragmentary end view looking toward the active end of the grinder head, but drawn to a much larger scale for purposes of clarity.

Fig. 11 is a perspective view of a collet-closure sleeve hereinafter fully described.

Fig. 12 is a similar type view of the collet.

Fig. 13 is a fragmentary view of the nose portion of a twist drill having the point ground by the improved machine of this invention.

Fig. 14 is a similar view, but taken at right-angles to the preceding figure.

Figure 15 is a schematic view hereinafter fully explained.

Figures 1, 4:
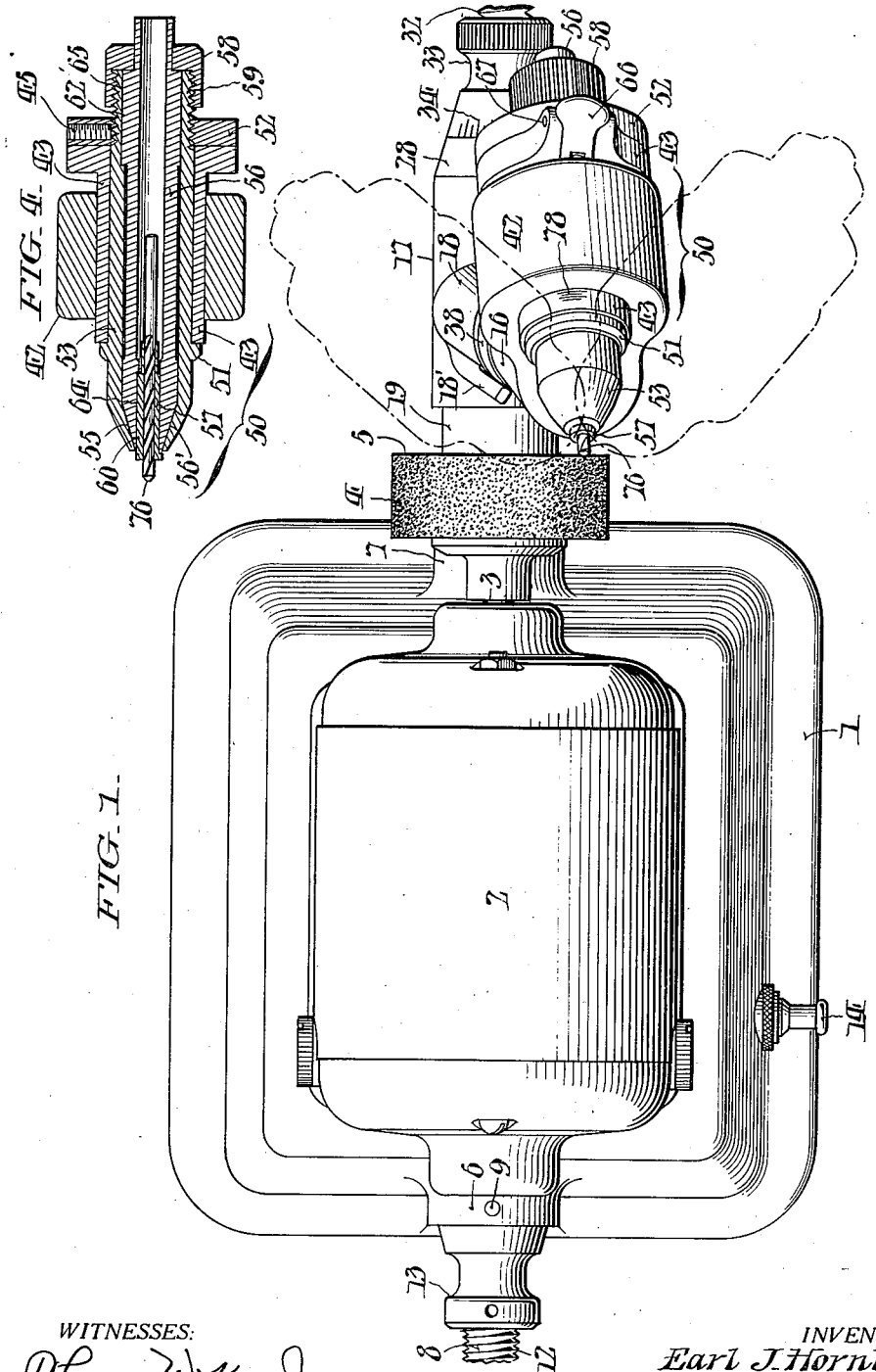
Fig. 1 is a plan view of a drill grinding machine embodying one practical form of this invention.
Fig. 4 is an axial section through the chuck-head and associated parts, taken on the plane IV—IV in Fig. 2.

Figs. 16-20, inclusive, are diagrammatic views illustrating how the novel angle of relief is obtained with the grinding machine of this invention.

In the following detailed description of the embodiment of this invention illustrated in the accompanying sheets of drawings, specific terms will be employed for the sake of clarity, but it is to be understood that such terms are used in a descriptive sense only and not for purposes of limitation. Each specific term is intended to include all technical equivalents capable of serving in a similar capacity to accomplish an analogous purpose.

Referring more in detail to the drawings which illustrate a typical embodiment of the invention, preferably adapted for the grinding or re-sharpening of comparatively small size twist drills, the machine therein shown comprises a hollow base 1, with a surmounted electric-motor 2, the rotor shaft 3 of which carries the grinding wheel 4, and the outer face 5 whereof constitutes the active part.

Mounted in bearings 6, 7, in the base 1, with capacity for limited axial movement, is a bar or shaft 8 restrained against rotation by a drop pin 9, in the bearing 6, having a diametric tooth 10 engageable in a longitudinal groove 11 with inclined ends, for purposes of elevating the pin 9 when it is desired to remove the shaft 8 from the base 1. The one end of the shaft 8 is screw-threaded at 12 and fitted with an adjuster or feed nut 13 for imparting axial movement to said shaft outwardly relative to the drop pin 9, for a purpose later on more fully explained; while 14 designates a conventional pull-and-push type switch controlling supply of electric current to the motor 2.

Figure 3:
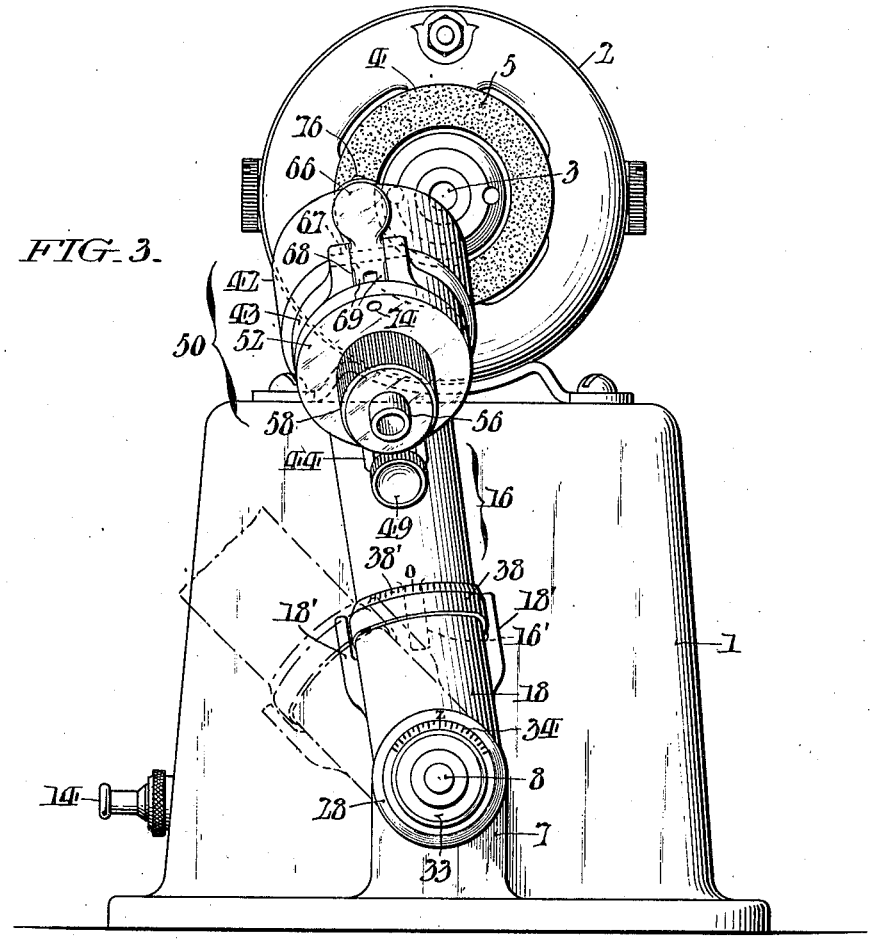
Fig. 3 is an end view looking from the right towards the left-hand of Fig. 2.

The shaft 8 projects outwardly beyond the bearing 7 to furnish a swingable-bearing 15 for an elbow support comprehensively designated 16, said bearing comprising a pivotal-portion 17, fitting the shaft 8, and an angularly-related branch 18 with spaced projections 18', Fig. 3. The elbow support 15 at its inner end is provided with a relatively reduced part 19 having a longitudinal rib 20, normally engaging a correspondingly sectioned groove 21, in the bore 22 of a cup-piece 23 abutting the base bearing 7, said cup-piece being provided with an arcual slot 24 into which a stationary pin 25, projecting outwardly from the bearing 7 engages; whereby provision is afforded for conjoint and limited movement of the bearing 15 and the cup-piece 23, as later on further amplified. Seating in a bore 26, of the body portion reduced end 19, is a spring 27 in abutment against the inner end of the cup-piece 23, whereby the swingable-bearing 15 is normally forced outwards against a stop-collar 28 fitted with a drop-pin 29 embodying a diametric tooth 30, engaging in a movement limiting groove 31, longitudinally of the screw-threaded end 32 of the shaft 8. This screw-threaded end 32 is of a much coarser pitch than the remote end 12, of the shaft 8, and it is fitted with an adjuster-nut 33 having graduations 34, Fig. 3, variably registerable with a zero-mark "Z" on the stop-collar 28.

Firmly screwed at 35 into the swingable-support angular branch 18 is an axis member 36, fitted with an eccentric bushing 37 and embodying a circumferential flange 38 having graduations 38', said flange abutting the confronting face of the angular branch 18. The bushing 37 is restrained against axial movement by a washer 39 and screw 40, threadedly engaged in the correspondingly-bored outer end of said axis member.

Mounted on the bushing 37 is the elbow support 16, hereinbefore referred to, said support having one part provided with a movement limiting lug 16' for coaction with the spaced projections 18' aforesaid, and it is bored at 41 for frictional engagement over the bushing 37, so that it is normally rotative therewith, but may be relatively moved, for a purpose later on set forth. The other part of the elbow support 16 is formed with a head or eye-bearing 42, the axis whereof is preferably directed at an angle of 59° from the vertical for production of the conventional drill point angle.

Figure 7:
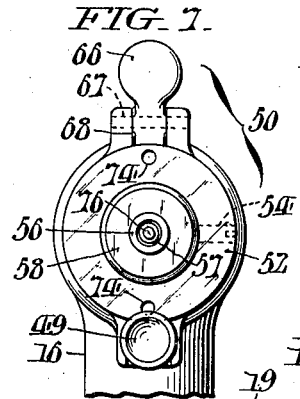
Figs. 7, 8 and 9, are detail sections on the planes VII—VII, VIII—VIII and IX—IX in Fig. 2, respectively.
Figure 8:
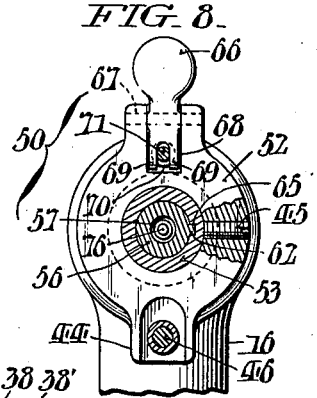

Mounted in the eye-bearing 42 with capacity for axial adjustment is the work-head which comprises a sleeve 43, having a flange 44 apertured at 45 for passage of a feed-screw 46, threadedly engaging a corresponding bore 47 in the elbow support 16, said bore being parallel with the axis of the sleeve 43; while the screw 46 is provided with a collar 48, and a knurled manipulator-head 49, for jointly effecting movement of the work-head, hereinafter comprehensively referred to as 50. Clamped in the sleeve 43 by aid of a flange 51 and a screw-threaded lock-collar 52 is a sleeve chuck 53, said chuck being restrained against rotation relative to the sleeve 43 by a locking screw 54, Figs. 2 and 7, and having the end facing the grindinig wheel 4 tapered at 55, for abutting coaction with the correspondingly-shaped end 56' of a collet-closer 56; said closer in turn receiving the shouldered collet 57. The closer 56 is caused to tightly grip the collet 57, by means of a screw-cap 58 engaging its outer threaded-end 59 in opposition to the tapering coaction set up between the taper parts 55 and 56'.

In order to properly align and "set" the collet 57 in the closer 56, with respect to the cutting edges of a drill to be ground, the former 57 is provided with a longitudinal rib 60 at right angles to the conventional diametrically opposed slots 61, while the latter 56 is formed with a similar and correspondingly disposed rib 62, beyond the outer ends of its slots 63, see Figs. 11 and 12. The respective ribs 60, 62 engage like sectioned and aligned grooves 64, 65, respectively. in the bore of the collet closer 56 and sleeve chuck 53, as best understood from Fig. 4. Thus it will be seen that a simple means is provided for accurately aligning the cutting edges of the drill in registration and parallelism with the diametrically opposing slots 61 and 63 of the collet 57, and its closer 53, respectively, as readily understood on an examination of Fig. 10.

An index latch 66 is fulcrumed at 67, in a gap 68 provided for the purpose in the work-head flange 44, with a fork-portion 69 thereof abutting the enlargement 70, intermediate the ends of a plunger 71, movable in a bore 72 in the eye-bearing 42 in opposition to a spring 73. The outer portion of the plunger 71 is engageable with either one of diametrically-opposed holes 74 in the lock-collar 52, so that the work-head 50 can be rotated through 180° and effectively held for grinding the point angles or lips 75 of the drill 76; see Figs. 10, 13 and 14 to best advantage. 78, Fig. 1, designates an index gage for initially setting the point of intersection 79, Fig. 15, of the axial lines through the work-head 50 and that passing up through the axis member 36 relative to the face 5 of the grinder 4.

Having explained the structure of the invention the operation is briefly as follows. The drill 76 to be ground is first inserted in the collet 57 until the point thereof projects outward of said collet, a distance approximately equal to the diameter of said drill, whereupon the latter is turned until the cutting edges or lips 75 align with the collet slot, as clearly shown in Fig. 10, when the spring tension inherent in the collet 57 holds said drill in place. The collet 57, with the inserted drill, is now placed in the closer 56, and the latter tightened-up by the screw-cap 58, in an obvious manner. The dial flange 38 is next turned to the graduation reading 38' corresponding to the size of the drill 76 to be ground, when the adjuster nut 33 is similarly turned with respect to the graduations 34, whereupon the motor 2 is started by the switch 14. The feed-screw 46 is now turned by its head 49 to advance the point of the drill 76 into contact with the face 5 of the grinder 4; whereupon the operator manually swings the work-head 50 on the axis member 36 in accordance with known practice. After the first lip 75 of the drill 76 has been ground, the entire work-head 50 and elbow 16 are bodily swung away from the grinder wheel 4, by rotation within the limits of the projections 18', as defined by the lug 16'. The work-head index latch 66 is now moved clockwise to release the lock device 70, whereupon the chuck 53 is given a half-turn and said device 70 allowed to snap-back into active position under the influence of the spring 73, which results in placing the other drill lip 75 in location for grinding and without making any adjustment of the feed-screw 46, whereupon the point of the drill is swung into contact with the grinder wheel face 5, and the work-head 50 with the elbow 16 rocked to-and-fro as aforesaid, whereby the drill is efficiently ground ready for removal from the collet 57 by a reversal of the inserting operation above first explained. By holding the drill 76 in the manner described, its point will be generated or ground concentric with the axis thereof; with the outside of the web 77, which produces two cutting angles or lips 75 on a two-lip drill, both removing equal-sized chips, which ensures the drill 76 boring a hole very slightly larger in diameter than that of said drill. This result cannot be obtained with a drill 76 ground off-center, or with one cutting lip 75 longer than the other. In other words, by gripping the drill 76 near the point, for grinding or re-setting purposes, any slight deflection in the body of said drill will not cause the point to be ground off-center.

Figure 9:
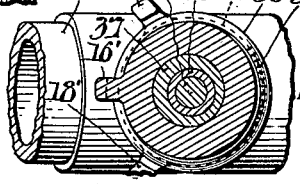

Another feature of advantage of this invention is that the relief angle 80 is slightly greater at or near the center than at the outer edges, which is highly desirable in order to prevent rubbing near the center when the relief angle 80 at the outside edges is correct for obtaining the most desirable boring action. The importance of this differential relief angle 80 will be readily understood from an inspection of Figs. 15–20 inclusive, and wherein explanatory legends are shown for purposes of comparison. The letter D designates the center line of a drill 76 in approximately its proper relation to the face 5 of the grinder 4; E is the axis on which the drill 76 is rotated while being ground, the center line of said drill being set some distance back of axis E. The relief radius produced at point A near the outer edge of the drill 76 is indicated in Figs. 17 and 18 as approximately five degrees at the cutting edge; while the relief radius at the point B near the center of said drill, swinging on radius D is shown as approximately seven-degrees; such variation in the relative angularity being merely typical to emphasize the fact that by this invention the relief angle is ground greater at or near the center than at the outer edges of the drill 76. With the grinder of this invention, the relief angle 80 on the end of a drill 76 can readily be varied to suit said drill to the rate of penetration best adapted for the material being drilled. This variation is accomplished by simply setting one or both of the graduations 34, 38', on the adjuster nut 33 and bushing flange 38 to a point above or below the standard graduations. The radius of the relief angle to be ground on the point of a drill is determined by the graduations 34 on the adjuster-nut 33, said graduations being defined to read directly proportional to the diameter of the drill 76 being ground. The center line of the drill 76 being ground is not in the same plane as the axis on which the elbow-support 16 oscillates while grinding the drill 76; while the amount the center line aforesaid is offset by the bushing 37, see Fig. 9, is determined by the size of the drill 76 being ground and is set at approximately one-sixth of the diameter of said drill, by rotation of the eccentric bushing flange 38, the graduations whereon are defined to read directly on the proper adjustment corresponding to the size of drill to be ground. Furthermore, adjustment of the nut 33 causes the entire work-head 50 and its support 16 to be moved concurrently toward or away from the grinder face 5. Hence by initially inserting a suitable device in the collet 57, or the diamond tool 81, Fig. 15, used for dressing the active face 5 of the grinder 4 in contact with said face, and setting the index mark at 78 in registration with the inner face of the eye-bearing 42, by rotation of the feed-screw 46 to move the work-head 50, relative to the elbow-bearing 16, and then screwing-up on the nut 33, with the graduations 34 and 38' both at zero, the proper point of intersection 79 is obtained; or the same adjustment is performed when the grinder machine has been used and the operator desires to reassure himself the correct point of intersection obtains before inserting a fresh drill to be ground. It is also to be noted that by axially moving the work-head 50 and rotating the eccentric sleeve 37, various angular points can be given the drills. Finally, it will be seen that the drill point is ground on a variable eccentric curvature relative to the axis of the drill, in conformity with piercing and primal cutting requirements, so that the initial borings are laterally displaced before entry into the drill cutting spiral.

The machine illustrated is well adapted for handling drills from three-sixteenths of an inch diameter down to and including drills of .020 inch diameter. However, it will be apparent that by obvious changes the machine is equally well adapted for grinding drills of larger sizes without departing from the spirit and scope of the invention.

Having thus described my invention, I claim:

1. In a machine of the type described including a rotary grinder with a stationary base, the combination of a drill-holder including a sleeve with means for adjusting it along an inclined axis; an elbow-support for the drill-holder sleeve, said support having a fulcrum bore with an eccentric-section bushing therein; movable bearer means associated with the stationary base having an axis member engaged in the bushing bore; means for rotating the bushing to determine the relief angle given the drill point; and means for adjusting the movable bearer relative to the stationary base for setting the point of intersection of the elbow-support axis of oscillation with that of the drill holder in respect to the active face of the rotary grinder.

2. In a machine of the type described including a rotary grinder with a stationary base, the combination of a drill-holder including a sleeve with means for adjusting it along an inclined axis; means whereby the drill-holder may be given a half-turn relative to its associated sleeve and effectively held at the limits of such half-turn while grinding the drill point lips; an elbow-support for the drill-holder sleeve, said support having a fulcrum bore with an eccentric-section bushing therein; movable bearer means associated with the stationary base having an axis member engaged in the bushing bore; means for rotating the bushing to determine the relief angle given the drill point; and means for adjusting the movable bearer relative to the stationary base for setting the point of intersection of the elbow-support axis of oscillation with that of the drill holder in respect to the active face of the rotary grinder.

3. In a machine of the type described including a rotary grinder with a stationary base, the combination of a drill-holder including a sleeve with means for adjusting it along an inclined axis; means whereby the drill-holder may be given a half-turn relative to its associated sleeve and effectively held at the limits of such half-turn while grinding the drill point lips; an elbow-support for the drill-holder sleeve, said support having a fulcrum bore with an eccentric-section bushing therein; movable bearer means associated with the stationary base having an axis member engaged in the bushing bore; means limiting arcual rotation of the bearer means outwards and inwards from a predetermined grinding position for insertion of a drill into, and its removal from, the holder; means for rotating the bushing to determine the relief angle given the drill point; and means for adjusting the movable bearer relative to the stationary base for setting the point of intersection of the elbow-support axis of oscillation with that of the drill holder in respect to the active face of the rotary grinder.

4. In a machine of the type described including a rotary grinder with a stationary base, the combination of a drill-holder including a sleeve with means for adjusting it along an inclined axis; an elbow-support for the drill-holder sleeve, said support having a fulcrum bore with an eccentric-section bushing therein; movable bearer means associated with the stationary base having an axis member engaged in the bushing bore; means for rotating the bushing to determine the relief angle given the drill point; and an axially shiftable bar sustained by the stationary base with adjuster devices for setting the point of intersection of the elbow-support axis of oscillation with that of the drill-holder in respect to the active face of the rotary grinder.

5. In a drill-grinding machine, a base with a surmounted motor; a grinding wheel on the shaft of the motor; a bar extending through bearings in the base with means restraining it against rotation; means permitting controlled axial adjustment of said bar; a pivotal bearer on one end of the bar embodying an angularly-related branch with spaced projections and an axis member; means in the form of a pin-and-slot connection limiting pivotal movement of the bearer relative to the bar; an eccentric bushing on the axis member, said bushing having a circumferentially graduated flange; an elbow-device having one portion bored for frictional engagement over the eccentric bushing, and the other part embodying an eye-bearing, the axis whereof is directed at a predetermined inclination from the vertical; a work-head sleeve extending through the eye bearing; a chuck in said sleeve with means restraining said parts against relative rotation; a collet closer and collet in the chuck for reception of a drill to be ground; latch means controlling rotation of the chuck; a lateral lug on the elbow-device engageable with the pivotal bearer spaced projection for limiting oscillatory movement of said elbow-device; and adjuster means coactive with the work-head sleeve and elbow-device for axially moving said sleeve and the collet as a unit towards or away from the active face of the grinding wheel.

6. A drill grinding machine as defined in claim 5, wherein the base bar is disposed in parallel below the motor shaft, and the means restraining it against rotation comprising a longitudinal groove therein and a drop-pin through an adjoining bearing wall having a tooth engageable in said groove.

7. A drill grinding machine as defined in claim 5, wherein the means permitting adjustment of the base bar comprise screw-threaded end portions thereof; a graduated adjuster nut with an associated stop-collar on one screw-threaded end, such stop collar having a drop-pin with a tooth engageable in a longitudinal groove in said screw-threaded end; and a second adjuster or securing nut on the other screw-threaded end of the base bar aforesaid.

8. A drill grinding machine as defined in claim 5, wherein the pivotal bearer on the base sustained bar has one end reduced and bored; a cup-device coacts with the pivotal bearer reduced end, said reduced end having a longitudinal rib for coaction with a corresponding groove in the cup-device to prevent relative rotation; a spring in compression housed within the cup-device and pivotal bearer bored end forces said bearer against a stop collar on the base bar; and a pin projects from the machine base into an arcual slot in the cup-device for limiting conjoint rotary movement of the pivotal bearer and cup-device relative to the base bar.

9. A drill grinding machine as defined in claim 5, wherein the elbow-device and eccentric bushing have a friction fit to ensure normal joint rotative movement, and said bushing is restrained against axial movement by a washer and screw threadedly engaging the pivotal bearer branch axis-member.

10. A drill grinding machine as defined in claim 5, wherein the work-head sleeve is provided with a flange having an aperture therethrough, and a feed-screw rotatively engages through said aperture with its threaded portion operatively engaging in a corresponding screw-bore paralleling the axis of the work-head sleeve.

11. A drill grinding machine as defined in claim 5, wherein the chuck is in the form of a sleeve having the end portion facing the grinding wheel tapered, said chuck sleeve being provided with a flange for abutment against one end of the work-head sleeve, a screw-threaded lock-collar on the other end of the chuck sleeve for clamping it to the work-head sleeve, and a radial screw through the lock collar secures the latter to the chuck sleeve.

12. A drill grinding machine as defined in claim 5, wherein the chuck is in the form of a sleeve fitted with a clamping collar having a pair of diametrically-spaced holes therethrough, a spring-influenced plunger having an enlargement intermediate the ends is housed in a bore in the elbow-device eye-bearing, said plunger outer end being engageable in either of the collar holes aforesaid, and an index latch fulcrumed in a gap in a flange on the work-head sleeve, said latch having a fork portion abutting the plunger enlargement outer face for effecting release of the plunger from the clamping collar holes to permit half-rotation of the chuck sleeve.

13. A drill grinding machine as defined in claim 5, wherein the chuck is provided with a tapering active end portion, the collet-closer is diametrically split longitudinally for a predetermined distance correspondingly tapered and provided with a longitudinal rib beyond the split portion for engagement in a complemental groove in the work-head sleeve, the collet is similarly split and provided with a longitudinal rib midway therebetween, said rib being engageable in a groove interiorly of the collet closer, and a screw-cap on the end of the chuck remote from its tapering end operative to clamp the collet-closer and collet firmly about a drill in opposition to the chuck active end.

14. A drill grinding machine as defined in claim 5, wherein the chuck is provided with a tapering active end portion, the collet-closer is diametrically split longitudinally for a predetermined distance and correspondingly tapered and provided with a longitudinal rib beyond the split portion for engagement in a complemental groove in the work-head sleeve, and the collet is similarly split and provided with a longitudinal rib mid-way therebetween, said rib being engageable in a groove interiorly of the collet closer, whereby provision is made for accurately aligning the cutting edges of an inserted drill in registration and parallelism with diametrically opposed slots in the collet closer and collet.

15. In a drill grinding machine as defined in claim 5, wherein the collet closer active portions are adapted when clamped on the collet to effect substantial grippage lengthwise of the drill web inwardly of the drill point, whereby said point when ground is positively generated concentric with said web and with two cutting edges of identical size.

EARL J. HORNBERGER.